United States Patent [19]

Peigari

[11] Patent Number: 4,582,982
[45] Date of Patent: Apr. 15, 1986

[54] ELECTRICAL HEATING CONTROL SYSTEM

[75] Inventor: William A. Peigari, Westfield, N.J.

[73] Assignee: General Electronic Engineering, Inc., Rahway, N.J.

[21] Appl. No.: 602,053

[22] Filed: Apr. 19, 1984

[51] Int. Cl.[4] .......................... H05B 1/02; G01K 13/00
[52] U.S. Cl. ..................................... 219/490; 219/497;
219/508; 219/483; 219/213; 374/121; 374/30;
340/584; 165/12; 236/1 C
[58] Field of Search ............... 219/494, 213, 491, 483,
219/486, 492, 490, 507, 508, 497; 374/25, 29,
121, 30; 236/1 C; 165/12; 340/589, 584

[56] References Cited

U.S. PATENT DOCUMENTS 4,040,565 8/1977 Christiansen ..................... 219/497
4,274,475 6/1981 Rall et al. ........................ 219/497

Primary Examiner—M. H. Paschall
Attorney, Agent, or Firm—Siegmar Silber

[57] ABSTRACT

An electrical heating system for buildings is described in which the output voltage to a resistance heater is varied in accordance with outside temperature. The disclosure includes system means for compensating for solar radiation and wind effects. Also, night setback and morning start up are provided. The heat present on the interior of the building is provided in accordance with the building characteristics and without regard to interior temperatures.

6 Claims, 1 Drawing Figure

1

ELECTRICAL HEATING CONTROL SYSTEM

FIELD OF THE INVENTION

This invention relates to a system for controlling the heating of buildings, and more particularly to maintaining an economical, steady comfort level in the perimeter zone or that interior space adjacent the building's outer walls. Further, the system is especially adapted to electric heating.

BACKGROUND OF THE PRIOR ART

In the past, numerous systems have been suggested for controlling the heating of buildings. The most common system is the ordinary thermostatic control in which a bimetallic strip remote from the room heat source, (usually mounted on an interior wall near the center of the building) operates a switch at predetermined levels to turn the heat inlet ON and OFF.

It has been found, especially in commercial buildings, that ordinary thermostatic control is undesirable. As a consequence numerous features have been added to promote fuel efficiency and increase comfort, among which are compensation for solar radiation, night temperature setback and automatic startup. The latter features have been particularly stressed because of new requirements arising from the BOCA Code.

With electric heat, the problems of system controls are further exacerbated by utility company charges for, not only consumption, but also peak loading. Thus, while less fuel is used, the economy is not realized financially.

In the course of prepartion for the instant application a patentability search was performed having a field of search which comprised of U.S. Classifications 219/494, 236/91, and 236/46 through 49. The search uncovered the following patents:

| U.S. Pat. No. | Inventor | Date of Issue |
| --- | --- | --- |
| 4,189,094 | Robinson | 2/19/80 |
| 4,176,785 | Allard, et al | 12/4/79 |
| 4,172,555 | Levine | 10/30/79 |
| 4,077,566 | Bradford | 3/7/78 |
| 4,040,565 | Christiansen | 8/9/77 |
| 3,964,676 | Rooks, et al | 6/22/76 |
| 3,450,862 | Kralovec | 6/17/69 |

Of the patents included on the search, the Kralovec patent was considered inapplicable as an indoor heat sensing element was utilized which was mounted immediately adjacent the heating element so as to sense heat output therefrom.

In the patent to Christiansen, U.S. Pat. No. 4,040,565, a mathematical equation for energy supplied to a building is derived at Column 3, line 32 and is expressed in terms of retained heat and lost heat. Christiansen attempts to define the heat capacity of a building and to construct an analog model which takes into account both the inside and outside temperatures. Christiansen is considered as teaching away from the present disclosure as the analog control thereof is taught as being not feasible without regard to inside temperature measurement.

Similarly, the other patents were analyzed and considered not to disclose the teaching of the present invention.

SUMMARY OF THE INVENTION

In the disclosed invention hereof, a different approach is taken to the control of heat in a building. The building which is subject to control is first analyzed as an element or a parameter for control purposes. The analysis determines on an empirical basis the heat loss characteristics of the structure, and for primary control purposes, determines the effect of ambient temperature changes upon the structure. For heating purposes, perimeter heating units are employed. Heat is added to the structure which according to the building charcteristics requires more or loss heat, raising or lowering the power in to the perimeter heating units.

For the heating system to maintain an economical, steady, comfort level, heat is added at the same rate as heat is being lost from the building. These losses primarily occur at the perimeter zone or the building walls. Since the heating system is located very close to the exterior wall, approximately one foot of the interior area adjacent to that wall is considered part of a perimeter zone. This perimeter zone, when supplied with the correct amount of heat acts as a thermal barrier and effectively insulates the remaining interior areas of the building from heat losses. Thus, the interior zone has not heating requirements and can be ideally designed for a cooling only load.

There are also human factors involved in perimeter heating systems. Continuous steady perimeter heating also creates radiation barrier within the perimeter zone. A person's body constantly radiates or gives up heat at a rate depending on many factors including the location of objects of cooler temperatures nearby. It is much more comfortable if there is a thermal envelope such as created by modulated, continuous heating in the perimeter zone. Body radiation is therefore reduced and a higher degree of comfort is maintained with a lower space temperture. Also, as the perimeter zone is rarely occupied, the local space temperature thereof may be maintained below that of the occupied interior zone.

Other aspects of the invention will become apparent as the drawings which follow are understood by reading the corresponding description thereof.

DESCRIPTION OF THE PREFERRED EMBODIMENT

Figure 1:
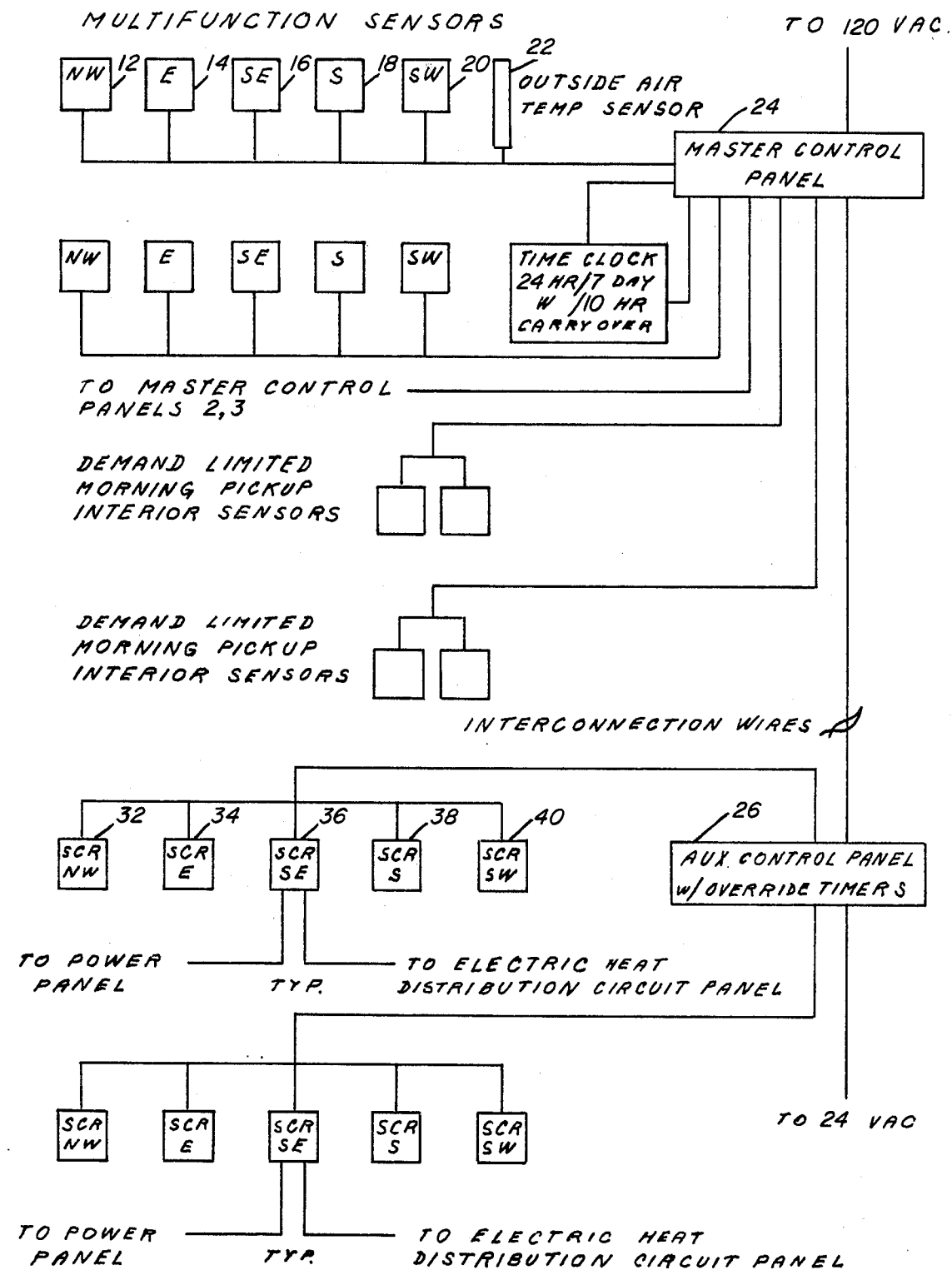
FIG. 1 is a block diagram of the electric heating control system of this invention and shows schematically two zones with arrays of multifunction sensors and the SCR control associated with each sensor.

In the present invention, two types of control loops are employed, namely, a closed loop control for setting the general heat level of the building and one or more open loops for adjusting the primary control to take into account other system and environmental variables.

The primary control loop is based upon the validity of the premise that a given building has an established heat loss characteristic by which heat is lost largely through the outer walls thereof at a rate related to the outside temperature. A further corollary of this premise is that, without conditioning, the air in the central portion of a building will remain at relatively stable heat levels and people in this zone experience comfortable ambient conditions over a reasonably broad temperature range. Conversely, at the site of heat loss, namely, the perimeter, a region of discomfort exists which needs rectifying by a controlled heating system to add back heat lost. From experimental work with perimeter heating, it has been found that active outside temperature sensors for controlling the heat output of electric perimeter heaters are effective in providing make up heat at the adversely affected zone of the building. The closed nature of this control loop results in being able to "tune" or calibrate each building in response to the heat loss characteristic thereof and to have the total heat added as a function of outside temperature correlated with the heat output of the heaters. This is in contrast to providing heat in response to changes in the interior temperature of the structure.

The secondary control loops are open loops for modifying the primary control loop. Such controls as monitoring solar radiation and wind effects and providing night setback and morning startup are among the most commonly employed secondary controls.

In the case of solar radiation an active sensor is used to respond to solar heat level and responds also to the additional radiation derived from reflected heat. In this mode the secondary control loop automatically adjusts the heat output of the resistance heater to compensate for the solar exposure. This compensation is proportional to the solar heat gain on the building exposure controlled by the solar sensor.

Similarly, the wind effect sensor compensates for boundary layer disturbances which tend to accelerate heat losses through the building's skin. Through this sensor the heat output is increased and the compensation improves the buildings comfort by reducing the presence of air at temperatures considerably different from that of the building core.

In the preferred embodiment the active sensor which serves for monitoring outside temperature is constructed as an analog of the building and therefore includes both solar radiation and wind effect compensating elements.

In the morning startup compensation a temperature ramp is established so that the increase in interior temperature will be at a constant rate and will preclude using excessive energy and thereby avoid high demand utility charges. To accomplish this the initial time for onset of morning startup is determined by an interior temperature sensor which acts merely to "set the clock". The rate of increase of temperature is then controlled by the startup circuitry so that the building temperature is returned to normal day operating temperature in time for the arrival of workers at the building. This feature operates in conjunction with the night setback provision by which the building temperature is permitted to decay to a new operating point with the decay rate determined entirely by the building heat loss characteristic. This heating system feature is coordinated with air damper operations, air conditioning fan operation and other elements in the air conditioning and ventilating system.

FIG. 1 is a block diagram illustrating a preferred embodiment of the present invention and comprises a northwest zone multifunction sensor 12 located in a first building portion and, in the same building portion, an east zone multifunction sensor 14, a southeast zone multifunction sensor 16, a southeast zone multifunction sensor 18 and a southwest zone multifunction sensor 20. Additionally an outside air temperature sensor 22 is provided for baseline reference (rather than control function). These sensors 12 through 22 transmit control signals to the master control panel 24 where the signals are processed for control purposes. The multifunction sensors of this system are structured to provide an analog signal combining the effects of outside temperature, solar radiation, and wind. In processing these signals, the master control panel 24 is structured to provide both primary and secondary control signals whereby the primary control signals will uniformly control all heating zones and secondary control signals will differentially control the heating zones. Typical of the primary control function, with the wind effect isolated by a derived signal from the northwest multifunction sensor and with the radiation (or solar) effect similarly derived by processing disparate multifunction sensor signals. The balance of the multifunction sensor signals can then be processed by summing and averaging to provide a primary control signal representing outside temperature.

The derived primary control signal from master control panel 24 is used to provide through the auxiliary control panel 26 a proportional voltage output for heating control. This signal is distributed to all the SCR power controllers which control the heat output in each of the respective zones, to wit: SCR NW control 32; SCR E control 34, SCR SE control 36; SCR S control 38; and SCR SW control 40. At the master control panel 24, the dervied primary control signal (which is previously described as an analog signal) is further modified at the master control panel 24 by a calibration circuit (not shown) to adjust on a semi-empirical basis for the building heat loss characteristic.

In the particular electric heating control system disclosed, the variation in building voltage supply is compensated through feedback control 42. Variations in voltage supplied is detected at the SCR voltage monitoring circuitry (shown as four-wire control circuit) and is provided to the auxiliary control panel 26. At panel 26, the baseline of the primary control signal is then adjusted accordingly so that the total heat output resulting from the shifts in the derived primary control signal remains constant regardless of changes in building voltage supplied.

The signals from the multifunction sensors 12, 14, 16, 18 and 20 are further processed to obtain derived secondary control signals, namely, wind and solar compensation. These signals are used at each zone control to adjust heat output therewithin. As contrasted to the previously discussed control, the secondary control is akin to fine tuning the building. Thus, in the zone served by the SCR SE control 36, the solar radiation during a November sunny day is monitored by multifunction sensor SE 16 and a secondary control signal is derived at the master control panel 24. As the total heat output required by this zone under such conditions is obviously less, the reduction of output is demanded by the control signal. Similarly, the monitoring of wind intensity and compensating for building heat loss because of wind factors is also gained. When both a solar radiation control signal and a wind intensity control signal are dervied for a single zone, the signals are preferably summed to comprise a single, composite secondary control signal for each zone.

To maintain building code requirements, the electrical heating control system is specified as complying with night setback conditions. Under such specifications, the heating system interacts with the ventilating system of the building. Under such constraints in the system at hand, time clock 44 is structured (in the unoccupied building) to depress the primary control signal baseline to a lower outside air temperature trigger point. If this baseline is now set at 50° F. and operates independent of building heat loss characteristics. In this mode, if climatic conditions are such that the outside temperature does not fall below the predetermined level then no energy use is experienced.

Within the state-of-the-art two alternative night setback subsystems are now indicated. A first alternative to the night setback based on outside temperature is that based on building heat loss characteristic. By this means, the heat output requirement is reduced and independent of outside temperature, a specific but lower amount, of heat is constantly added to the building system. As the ventilating system is inoperative and substantially no solar radiation effect is experienced, the building approaches close to a steady-state condition and the actual heat loss then approaches calculated heat loss. By adding known amount of heat output severe demand upon morning startup can be limited. A second alternative to the night setback methods described above is a night setback determined by interior temperature sensors or ordinary thermostatic controls.

Although the best mode of the invention has been described herein in some detail, it has not been possible to include each and every variation. Those skilled in the art of designing, developing, and constructing control systems for electric heating will be able to make slight variations in the electrical and mechanical arrangements suggested hereby without departing from the spirit of the invention and still be within the scope of the claims appended hereto.

What is claimed is:

1. An electric heating control system for a building having a determined heat loss characteristic and a heating system including an electrical heater means for supplying variable amounts of heat to said building in accordance with predetermined power supplied to the electrical means, said control system comprising, in combination:

first environmental condition sensing means for sensing the outdoor ambient temperature;

first power control means, for controlling the operating power in response to the monitored first environmental condition;

said first power control means having a calibrated response to maintain the output heat from said heater means constant during substantially constant environmental conditions outside said building;

at least one second environmental condition sensing means for sensing a parameter selected from wind effect, solar radiation effect, other boundary layer disturbances or the combined effect of two or more thereof;

second power control means including said outdoor temperature sensing element and connected to said first power control means for resetting said first power control means from one balanced level to another in response to changes in the outside environmental conditions as sensed by first and said second environmental condition sensing means variable power means coupled to said heater means and responding to changes from the balanced level of said first and second power control means to proportionally vary said heater means operating power and correspondingly the heat output of said heater means;

voltage monitoring means responding to said changes in input voltage to said heater means for rebalancing to operate at another voltage level; and said heating system precalibrated in accordance with building heat loss characteristics and without using internal building temperature as a control parameter.

2. An electric heating control system as described in claim 1, wherein said first power control means is responsive to a first derived control signal.

3. An electric heating control system as described in claim 2, further comprising, in combination:

a plurality of multifunction sensors arrayed on various sides of said building each having a signal output variable with the combined effect of outside temperature, wind, solar radiation and air leakage;

first signal processor means for comparing, averaging, summing, and differentiating said signal outputs to derive said first power control means; and, second signal processor means for comparing, averaging, summing, and differentiating said signal outputs to derive said second power control means.

4. An electric heating control system as described in claim 2, wherein said first derived control signal is proportionate to the calculated building heat loss characteristic.

5. An electric heating control system as described in claim 1, wherein said second power control means is responsive to a second derived control signal.

6. An electric heating control system as described in claim 5, wherein said second derived control signal is in part a signal proportionate to the calculated building heat loss characteristic.

* * * * *

UNITED STATES PATENT AND TRADEMARK OFFICE
CERTIFICATE OF CORRECTION

PATENT NO. : 4,582,982
DATED : April 15, 1986
INVENTOR(S) : William A. Piegari

It is certified that error appears in the above-identified patent and that said Letters Patent is hereby corrected as shown below:

On the title page, the inventor's name should read

-- William A. Piegari --.

Signed and Sealed this

Fifth Day of August 1986

[SEAL]

Attest:

DONALD J. QUIGG

Attesting Officer

Commissioner of Patents and Trademarks